United States Patent
Tulabandhula et al.

(10) Patent No.: US 10,008,121 B2
(45) Date of Patent: Jun. 26, 2018

(54) METHOD AND SYSTEM FOR MANAGING A DISPATCH OF VEHICLES

(71) Applicant: XEROX CORPORATION, Norwalk, CT (US)

(72) Inventors: Theja Tulabandhula, Bangalore (IN); Narayanan Unny Edakunni, Bangalore (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 0 days. days.

(21) Appl. No.: 15/143,701

(22) Filed: May 2, 2016

(65) Prior Publication Data
US 2017/0316697 A1    Nov. 2, 2017

(51) Int. Cl.
     *G08G 1/123*      (2006.01)
     *G08G 1/00*      (2006.01)

(52) U.S. Cl.
     CPC ............. *G08G 1/202* (2013.01); *G08G 1/123* (2013.01)

(58) Field of Classification Search
     CPC ............................... G08G 1/202; G08G 1/123
See application file for complete search history.

(56) References Cited

U.S. PATENT DOCUMENTS

| | | | | |
|---|---|---|---|---|
| 6,411,897 | B1* | 6/2002 | Gaspard, II | G01C 21/343 340/991 |
| 7,624,024 | B2 | 11/2009 | Levis et al. | |
| 8,706,411 | B2 | 4/2014 | Zhu et al. | |
| 9,159,032 | B1 | 10/2015 | Tripathi et al. | |
| 2002/0055818 | A1 | 5/2002 | Gaspard, II | |
| 2010/0299177 | A1* | 11/2010 | Buczkowski | G06Q 10/06 705/7.13 |
| 2015/0294430 | A1* | 10/2015 | Huang | G06Q 50/26 705/7.24 |
| 2015/0324708 | A1* | 11/2015 | Skipp | G06Q 10/025 705/5 |
| 2016/0335576 | A1* | 11/2016 | Peng | G08G 1/202 |

OTHER PUBLICATIONS

Di Lorenzo et al., "AllAboard: Visual Exploration of Cellphone Mobility Data to Optimise Public Transport", IEEE Transactions on Visualization and Computer Graphics, vol. 22, No. 2, Feb. 2016, pp. 1036-1050.*

(Continued)

*Primary Examiner* — Todd Melton
(74) *Attorney, Agent, or Firm* — Jones Robb, PLLC

(57) ABSTRACT

The disclosed embodiments illustrate method and system for managing a dispatch of vehicles based on generation of a dispatch schedule. The method includes generating a dispatch schedule for one or more vehicles at one or more time instants based on a first demand for the one or more vehicles along a route. For a current time instant, the method includes predicting a second demand for the one or more vehicles at each of the one or more stations, at time instants subsequent to the current time instant, based on a current demand. The method further includes updating the dispatch schedule by varying the count of vehicles to be dispatched from the first station based at least on the second demand. Further, the method includes transmitting a notification to a computing device installed in each of the one or more vehicles.

19 Claims, 6 Drawing Sheets

(56) References Cited

OTHER PUBLICATIONS

Juan Carlos Munoz, Cristian E Cortes, Ricardo Giesen, Doris Saez, Felipe Delgado, Francisco Valencia, and Aldo Cipriano. Comparison of dynamic control strategies for transit operations. Transportation Research Part C: Emerging Technologies, 28:101{113, 2013.
Doris Saez, Cristian E Cortes, Freddy Milla, Alfredo Nunez, Alejandro Tirachini, and Marcela Riquelme. Hybrid predictive control strategy for a public transport system with uncertain demand. Transportmetrica, 8(1):61{86, 2012.
Cristian E Cortes, Sergio Jara-Daz, and Alejandro Tirachini. Integrating short turning and deadheading in the optimization of transit services. Transportation Research Part A: Policy and Practice, 45(5):419{434, 2011.
Jean-Fran_cois Cordeau and Gilbert Laporte. The dial-a-ride problem: models and algorithms. Annals of Operations Research, 153(1):29{46, 2007.

\* cited by examiner

METHOD AND SYSTEM FOR MANAGING A DISPATCH OF VEHICLES

TECHNICAL FIELD

The presently disclosed embodiments are related, in general, to a transportation system. More particularly, the presently disclosed embodiments are related to methods and systems for managing a dispatch of vehicles based on generation of a dispatch schedule.

BACKGROUND

Typically, transport agencies determine a fixed schedule for dispatch of vehicles on one or more routes, based on historical demand. The dispatch of such vehicles may be scheduled by the transport agencies in a manner that public demands along these routes are met. However, in most of the scenarios, the public demand is not constant, and may vary based on various parameters, such as time of a day, a public meeting, or a festival. Considering all such parameters, the fixed schedule for dispatching the vehicles on the one or more routes, may not be sufficient to cater the varying public demand. Therefore, there is a need for a robust method and system to manage the schedule for dispatching the vehicles along the one or more routes.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for managing a dispatch of vehicles based on generation of a dispatch schedule. The method includes generating, by one or more processors, a dispatch schedule for one or more vehicles at one or more time instants based on a first demand for the one or more vehicles at one or more stations in a route and a count of the one or more vehicles, wherein the dispatch schedule comprises at least a count of vehicles, from the one or more vehicles, to be dispatched from a first station of the one or more stations at the corresponding time instant. At a current time instant of the one or more time instants, the method further includes predicting, by the one or more processors, a second demand for the one or more vehicles at each of the one or more stations, at the one or more time instants subsequent to the current time instant, based on a current demand received from one or more sensors at each of the one or more stations. The method further includes updating, by the one or more processors, the dispatch schedule by varying the count of vehicles, from the one or more vehicles, to be dispatched from the first station based at least on the second demand and the count of the one or more vehicles. The method further includes transmitting, by one or more transceivers, a notification to a computing device installed in each of the one or more vehicles, wherein the notification comprises an updated dispatch schedule for the corresponding vehicle, wherein each of the one or more vehicle dispatches from the first station based on the updated dispatch schedule.

According to embodiments illustrated herein, there is provided a system for managing a dispatch of vehicles based on generation of a dispatch schedule. The system includes one or more processors configured to generate a dispatch schedule for one or more vehicles at one or more time instants based on a first demand for the one or more vehicles at one or more stations in a route and a count of the one or more vehicles, wherein the dispatch schedule comprises at least a count of vehicles, from the one or more vehicles, to be dispatched from a first station of the one or more stations at the corresponding time instant. At a current time instant of the one or more time instants, the one or more processors are further configured to predict a second demand for the one or more vehicles at each of the one or more stations, at the one or more time instants subsequent to the current time instant, based on a current demand received from one or more sensors at each of the one or more stations. The one or more processors are further configured to update the dispatch schedule by varying the count of vehicles, from the one or more vehicles, to be dispatched from the first station based at least on the second demand and the count of the one or more vehicles. The one or more processors are further configured to transmit a notification to a computing device installed in each of the one or more vehicles, wherein the notification comprises an updated dispatch schedule for the corresponding vehicle, wherein each of the one or more vehicle dispatches from the first station based on the updated dispatch schedule.

According to embodiments illustrated herein, there is provided a computer program product for use with a computing device. The computer program product comprises a non-transitory computer readable medium storing a computer program code for managing a dispatch of vehicles based on generation of a dispatch schedule. The computer program code is executable by one or more processors in the computing device to generate a dispatch schedule for one or more vehicles at one or more time instants based on a first demand for the one or more vehicles at one or more stations in a route and a count of the one or more vehicles, wherein the dispatch schedule comprises at least a count of vehicles, from the one or more vehicles, to be dispatched from a first station of the one or more stations at the corresponding time instant. At a current time instant of the one or more time instants, the computer program code is further executable by the one or more processors to predict a second demand for the one or more vehicles at each of the one or more stations, at the one or more time instants subsequent to the current time instant, based on a current demand received from one or more sensors at each of the one or more stations. The computer program code is further executable by the one or more processors to update the dispatch schedule by varying the count of vehicles, from the one or more vehicles, to be dispatched from the first station based at least on the second demand and the count of the one or more vehicles. The computer program code is further executable by the one or more processors to transmit a notification to a computing device installed in each of the one or more vehicles, wherein the notification comprises an updated dispatch schedule for the corresponding vehicle, wherein each of the one or more vehicle dispatches from the first station based on the updated dispatch schedule.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
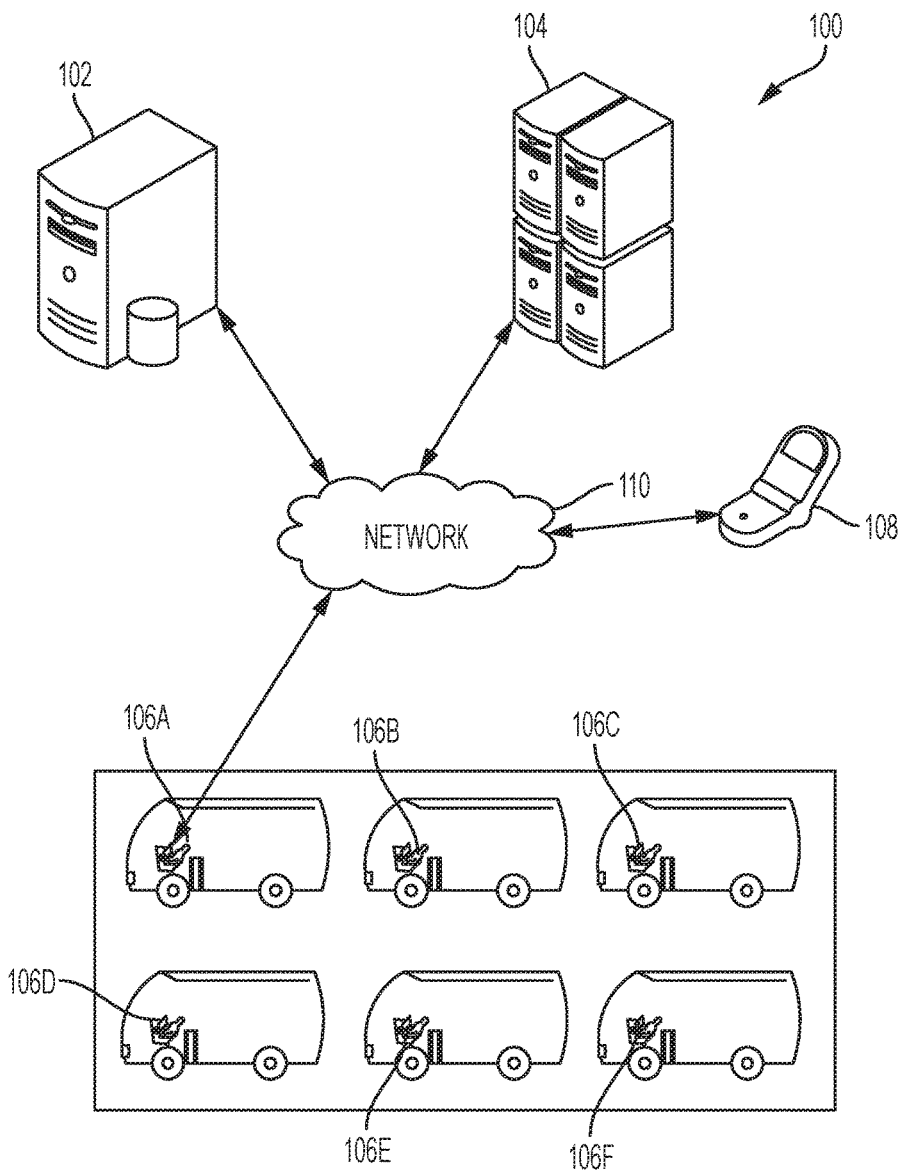
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" may refer to a device that includes one or more processors/microcontrollers and/or any other electronic components, a device, or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad® and Samsung Galaxy Tab®), and the like.

"One or more vehicles" may refer to a means of transportation that may transport one or more individuals and/or cargos between two or more locations along a route. In an embodiment, a group of one or more individuals may share a vehicle of the one or more vehicles. In an embodiment, the one or more vehicles may correspond to one or more of a bus, a truck, a car, a ship, an airplane, and the like.

A "count of one or more vehicles" may refer to a count of total vehicles possessed or controlled by a service provider associated with a transportation agency. For example, a transportation agency has 200 buses. This implies that the count of the one or more vehicles is 200.

A "count of vehicles dispatched" may refer to a count of vehicles that are dispatched from a first station of a route and are currently running along the route. For example, a transportation agency has 200 buses. Of the 200 buses, 118 buses are dispatched from the first station of the route, implying that the count of vehicles dispatched is 118.

A "count of remaining vehicles" may refer to a count of vehicles that are currently not dispatched but may be scheduled to dispatch in future. For example, a transportation agency has 200 buses. Of the 200 buses, 118 buses are dispatched on one or more routes. Thus, 82 buses are available to be dispatched at future time instants, implying that the count of remaining vehicles is 82.

"One or more time instants" may refer to fixed time instants at which one or more vehicles are scheduled to be dispatched on a route. In an embodiment, the one or more time instants may be determined by a service provider of a transport agency based on a demand at one or more stations in the route. For example, a transport agency dispatches three buses from a total of ten buses at "9:00 AM," "10:00 AM," and "11:00 AM," respectively. In such a case, "9:00 AM," "10:00 AM," and "11:00 AM" may correspond to the one or more time instants.

A "route" may refer to a path that may be traversed by a vehicle to pick up or drop one or more individuals. In an embodiment, the route may include one or more stations corresponding to one or more locations "s." The one or more stations may come in a predetermined order in the route. In an embodiment, the route may comprise at least one pair of stations having at least one source station and one destination station. For example, a city bus travels from Harlem to East Village in New York. Thus, the path from Harlem to East Village may correspond to a route with Harlem being a source station and East Village being a destination station. Hereinafter, the terms such as "stations" or "nodes" are used interchangeably.

A "dispatch schedule" of a vehicle along a route may correspond to a predefined time duration during which the vehicle may traverse along the route. In another embodiment, the dispatch schedule may also comprise a count of vehicles, from one or more vehicles, to be dispatched from a first station, of one or more stations, in the route at one or more time instants. In another embodiment, the dispatch schedule may also refer to a time instant at which a vehicle has to start from a source station, i.e., the first station. For example, three city buses from ten city buses are scheduled to be dispatched along a route (e.g., Harlem->East Village->Harlem, with a round trip time of one hour) at each of one or more time instants, "9:00 AM," "9.30 AM," and "10:00 AM," respectively.

A "user" may refer to an individual who may wish to avail a transport facility to commute between a pair of stations along a route. In an embodiment, the user may transmit a travel request to avail the transport facility using a computing device associated with him/her. In an embodiment, the user may pay some incentives in exchange of the transport facility. Hereinafter, "user," "commuter," "traveler," "rider," "requestor," or "passenger" may be interchangeably used.

A "demand" may refer to a request that may be initiated by one or more individuals corresponding to travel between a pair of stations along a route. In an embodiment, the demand may correspond to a historical demand, a first demand, a current demand, or a second demand. Hereinafter, "demand," "need," "request," or "requirement" may be interchangeably used.

A "historical demand" may refer to a demand for one or more vehicles at one or more stations in a route. In an embodiment, the historical demand is associated with a first count of users that commuted along the route at one or more other time instants prior to one or more time instants. For example, ten users commuted along Harlem->East Village->Harlem at "10:00 AM" on Dec. 18, 2015. In such a case, on Dec. 19, 2015 the demand corresponding to the ten users may be referred to the historical demand.

A "first demand" may refer to a predicted demand for one or more vehicles at one or more stations in a route. In an embodiment, the first demand may correspond to a second count of one or more users predicted to commute along the route based on a historical demand. For example, ten users are predicted to commute along Harlem->East Village->Harlem at "10:00 AM" on Dec. 19, 2015 based on a historical demand at "10:00 AM" on Dec. 18, 2015.

A "current demand" may refer to a real time demand and/or a pre-booked demand for one or more vehicles at one or more stations in a route, at a current time instant. In an embodiment, the pre-booked demand may correspond to one or more users who may have requested to travel along a route in advance (i.e., before a first predefined time interval prior to a date of travel). In an embodiment, the real-time demand may be determined based on one or more requests received during a second predefined time interval prior to the current time instant. In an embodiment, an unrealized demand at a time instant prior to the current time instant may also comprise the current demand. For example, ten user requests are received to travel along a route (e.g., Harlem->East Village) at "11:00 AM." The requests are received during a second predefined time interval, i.e., during "10:00 AM" to "11:00 AM." In such a case, the ten user requests may correspond to the current demand at "11:00 AM."

A "second demand" may refer to a predicted demand for one or more vehicles at one or more stations in a route. In an embodiment, the second demand is predicted for time instants that are temporally subsequent to a current time instant. In an embodiment, the second demand may be predicted based on a current demand at the current time instant. The second demand is associated with a fourth count of one or more users that are predicted to commute along a route based on the current demand.

A "demand served" may refer to realized demand for one or more vehicles at one or more stations in a route. In an embodiment, the demand served is associated with a set of first users from one or more users, such that their demand was met. For example, ten travel requests are received to travel along a route (e.g., Harlem->East Village) at "11:00 AM." At "11:00 AM," due to unavailability of vehicles, the demand of eight users from a total of ten users was met. In such a case, the eight users (i.e., the set of first users) may correspond to the demand served.

An "unrealized demand" may refer to a set of second users from one or more users whose demand for one or more vehicles was unmet at a time instant prior to a current time instant. For example, ten travel requests are received to travel along a route (e.g., Harlem->East Village) at "11:00 AM." At "11:00 AM," due to unavailability of vehicles, the demand of eight users out of ten users was met. In such a case, the two left over users (i.e., the set of second users) may correspond to the unrealized demand.

A "capacity of a vehicle" may refer to a maximum count of individuals that may be accommodated in a vehicle when the vehicle is empty. In an embodiment, the capacity of the vehicle corresponds to a maximum count of permissible vacant seats in the vehicle. Thus, the capacity of the vehicle may correspond to a total number of seats in the vehicle. For example, a city bus can accommodate 45 commuters, implying that the capacity of the city bus is "45."

"One or more performance metrics" may refer to one or more targets that a service provider of a transport agency wants to achieve. In an embodiment, the service provider of the transport agency may dispatch one or more vehicles to optimize one or more of the one or more performance metrics. The one or more performance metrics may comprise a demand served by the one or more vehicles, a count of vehicles dispatched from the one or more vehicles, a count of trips made by the one or more vehicles along the route, a revenue generated by the one or more vehicles, or an average user waiting time.

An "average user waiting time" may refer to a time duration up to which an individual (e.g., a commuter) may be required to wait for a vehicle at a station to travel between two stations along a route. For example, Jack requested for a bus to travel from a first station to a second station along a first route at "10.30 AM." The bus is scheduled to be dispatched at "10.50 AM." In such a case, 20 minutes is the average user waiting time for Jack.

FIG. 1 is a block diagram of a system environment 100 in which various embodiments may be implemented. The system environment 100 includes a database server 102, an application server 104, a vehicle-computing device 106, a user-computing device 108 and a network 110. Various devices in the system environment 100 may be interconnected over the network 110. FIG. 1 shows, for simplicity, one database server 102, one application server 104, vehicle-computing devices 106A to 106E (collectively referred to as a vehicle-computing device 106), and one user-computing device 108. However, it will be apparent to a person having ordinary skill in the art that the disclosed embodiments may also be implemented using multiple database servers, multiple application servers, multiple vehicle-computing devices, and multiple user-computing devices without departing from the scope of the disclosure.

The database server 102 may refer to a computing device that may be communicatively coupled over the network 110. The database server 102 may be configured to store information pertaining to one or more time instants at which the one or more vehicles are to be dispatched, and information pertaining to a geographical network. The geographical network may comprise a map data of one or more routes along which the one or more vehicles are to be dispatched.

In an embodiment, the database server 102 may be further configured to store a user profile associated with each of one or more users, such that the one or more users may utilize the one or more vehicles to commute along a route in the one or more routes. In an embodiment, the user profile of a user may comprise a user identification of the user and/or a travel history of the user, (i.e., one or more travel requests associated with the user). In an embodiment, the travel history of the user may further comprise a log of time instants at which the user may have travelled in the past. The log of time instants may be indicative of at least a sign-in and a sign-out of the user with respect to a vehicle-computing device, such as the vehicle-computing device 106A. In an embodiment, the log of time instants may be extracted from databases of one or more electronic ticketing systems or other transportation agencies. In an embodiment, the user profile of the user may be further updated based on one or more new travel requests raised by the user. An exemplary Graphical User Interface (GUI) for raising the travel request has been explained later in FIG. 6.

In an embodiment, the database server 102 may be further configured to store a historical demand and a current demand received from the application server 104. In an embodiment, the historical demand may be associated with the one or more travel requests at one or more other time instants, such that the one or more other time instants are temporally prior to the one or more time instants. In an embodiment, the current demand may be associated with one or more pre-booked travel requests or one or more real time travel requests. In an embodiment, a pre-booked travel request may correspond to a travel request raised by a user at least before a first pre-defined time period prior to a date of travel. For example, a user raises a travel request at "5:00 PM" on May 19, 2015. The travel request may correspond to a travel from a first station to a second station along a first route at "10.30 AM" on May 20, 2015. In such a case, the travel request may correspond to a pre-booked travel request. In an embodiment, a real time travel request may correspond to a travel request raised by a user at least before a second pre-defined time period prior to the time instant of travel. For example, a second user raises a travel request at "9:00 AM" on May 20, 2015. The travel request may correspond to a travel from a second station to a third station along a first route at "10:00 AM" on May 20, 2015. In such a case, the travel request may correspond to a real-time travel request. In an embodiment, the first predefined time period (e.g., one day) and the second pre-defined time period (e.g., one hour) may be defined by a service provider associated with the one or more vehicles.

In an embodiment, the database server 102 may store information pertaining to the one or more vehicles received from an agent-computing device (not shown) associated with a service provider of the one or more vehicles. For example, the information pertaining to the one or more vehicles may comprise a count of the one or more vehicles, a capacity of each of the one or more vehicles, a count of vehicles dispatched, a count of remaining vehicles, and/or the like.

In an embodiment, the database server 102 may be configured to store one or more performance metrics as defined by the service provider of the one or more vehicles. The one or more performance metrics may comprise at least a demand served by the one or more vehicles, a count of vehicles dispatched from the one or more vehicles, a count of trips made by the one or more vehicles along the route, a revenue generated by the one or more vehicles, and/or an average user waiting time. In an embodiment, the database server 102 may be further configured to store a dispatch schedule, received from the application server 104, to dispatch the one or more vehicles on the one or more routes at the one or more time instants.

Further, in an embodiment, the database server 102 may be configured to transmit or receive one or more instructions/queries/information to/from one or more devices, such as the application server 104, the vehicle-computing device 106, and the user-computing device 108, over the network 110. In an embodiment, the database server 102 may receive a query from the application server 104 to retrieve the historical demand, the current demand, and the information pertaining to the one or more routes/vehicles. For querying the database server 102, one or more querying languages may be utilized such as, but are not limited to, SQL, QUEL, DMX and so forth. Further, the database server 102 may be realized through various technologies such as, but not limited to, Microsoft® SQL server, Oracle®, and My SQL®.

The application server 104 refers to a computing device including one or more processors and one or more memories. The one or more memories may include computer readable codes and instructions that may be executable by the one or more processors to perform one or more predetermined operations. In an embodiment, the one or more predetermined operations may comprise generation of a dispatch schedule to dispatch the one or more vehicles along the one or more routes at the one or more time instants. In an embodiment, the one or more vehicles may correspond to total vehicles possessed by the service provider. In an embodiment, the service provider may be associated with a transportation agency (e.g., a public or a private transportation service). To generate the dispatch schedule, the application server 104 may be configured to determine the historical demand and a first demand for the one or more vehicles at the one or more stations of each route of the one or more routes.

In an embodiment, the application server 104 may determine the historical demand for the one or more vehicles based on the user profile of each of the one or more users. The historical demand may be associated with a first count of the one or more users who travelled along a route at the one or more other time instants. The one or more other time instants are temporally prior to the one or more time instants. In an embodiment, the application server 104 may be configured to predict a second count of the one or more users based on the historical demand. In an embodiment, the second count of the one or more users may correspond to the first demand. The application server 104 may utilize one or more prediction algorithms, such as, but not limited to, logistic regression algorithm and predictive modelling algorithm, for predicting the first demand. Further, the application server 104 may utilize the first demand to generate the dispatch schedule. In an embodiment, the application server 104 may utilize an Integer Learning Programming (ILP) technique to generate the dispatch schedule for managing the dispatch of the vehicles from the one or more vehicles at the one or more time instants from the first station of the one or more routes. The application server 104 may further transmit the historical demand, the first demand, and the dispatch schedule to the database server 102.

Further, the application server 104 may be configured to update the generated dispatch schedule based on a second demand such that the second demand is predicted based on the current demand. To determine the current demand associated with each of the one or more routes, the application server 104 may receive the one or more travel requests at the current time instant from one or more sensors installed at one or more stations of each of the one or more routes. Further, the application server 104 may determine a third count of the one or more users for each route, such that the third count of the one or more users associated with a route are scheduled to commute along the route at the current time instant. The application server 104 may determine the third count of the one or more users based on the received one or more travel requests at the current time instant. The third count of the one or more users associated with a route may correspond to the current demand for the route. In an embodiment, the application server 104 may be configured to predict a fourth count of the one or more users based for each route on the current demand associated with each route in the one or more routes. The fourth count of the one or more users may be predicted for time instants that are temporally subsequent to the current time instant. In an embodiment, the predicted fourth count of the one or more users may correspond to the second demand. For example, the current demand associated with a route at "11:00 PM" is ten users. Based on the current demand at "1:00 PM", the application server 104 may predict the fourth count of the one or more users who may commute along the route at "2:00 PM," "3:00 PM," and so forth. Further, the application server 104 may update the dispatch schedule based on the second demand.

In an embodiment, the application server 104 may update the dispatch schedule at the current time instant by utilizing one or more techniques, such as, but not limited to, Model predictive control (MPC) technique. In an embodiment, the application server 104 may update the dispatch schedule at the current time instant to optimize one or more of the one or more performance metrics specified by the service provider. The optimization of the one or more performance metrics may comprise maximizing the demand served by the one or more vehicles, minimizing the count of vehicles dispatched from the one or more vehicles, minimizing the count of trips made by the one or more vehicles along the route, maximizing the revenue generated by the one or more vehicles and/or minimizing the average user waiting time.

In an embodiment, the application server 104 may be configured to store the current demand and the second demand in the database server 102. Further, the application server 104 may be configured to update the dispatch schedule, for the current time instant, stored in the database server 102. The generation and the update of the dispatch schedule have been explained later in FIG. 3.

In an embodiment, the application server 104 may be further configured to transmit a first notification to the vehicle-computing device 106 of each of the one or more vehicles. In an embodiment, the first notification to the vehicle-computing device 106 of each of the one or more vehicles may comprise the updated dispatch schedule of the corresponding vehicle. In an embodiment, the application server 104 may further transmit a second notification to the user-computing device 108 of each of the one or more users. The second notification to the user-computing device 108 of each of the one or more users may comprise the updated dispatch schedule of the one or more vehicles. Further, the service provider of the one or more vehicles may utilize the updated dispatch schedule to manage a travel roster and various travel related logistics.

The application server 104 may be realized through various types of application servers, such as a Java application server, a .NET framework application server, a Base4 application server, a PHP framework application server, or any other application server framework. The operation of the application server 104 has been discussed later in FIG. 2.

A person having ordinary skill in the art will appreciate that the scope of the disclosure is not limited to realizing the database server 102 and the application server 104 as separate entities. In an embodiment, the functionalities of the database server 102 can be integrated into the application server 104, without any deviation from the scope of the disclosure.

The vehicle-computing device 106 refers to a computing device that includes one or more processors and one or more memories. The one or more memories may include computer readable codes and instructions that may be executable by the one or more processors to perform predetermined operations. In an embodiment, each of the one or more vehicles may include the vehicle-computing device 106. In an embodiment, the vehicle-computing device 106 may include a navigation device with inbuilt GPS sensors. Further, the one or more memories of the vehicle-computing device 106 may store information pertaining to the geographical network in which the corresponding vehicle plies. In an embodiment, the vehicle-computing device 106 may be configured to receive the first notification from the application server 104. In an embodiment, the vehicle-computing device 106 may present the first notification to an operator associated with the corresponding vehicle. Examples of the operator may include, but are not limited to, an individual driving a vehicle, an individual navigating the vehicle, or an individual coordinating a route of the vehicle. In an embodiment, the first notification may comprise the updated dispatch schedule, information pertaining to the route on which the vehicle is dispatched, and information pertaining to the time instant of the dispatch of the vehicle. In an embodiment, the vehicle-computing device 106 may display the route, on which the corresponding vehicle is dispatched, to the operator. In an embodiment, the vehicle-computing device 106 may transmit a real time location of the corresponding vehicle to the application server 104 after the vehicle is dispatched on the route. An example of a GUI displaying the first notification on the vehicle-computing device 106 has been explained in FIG. 4.

The vehicle-computing device 106 may correspond to a variety of computing devices, such as a laptop, a PDA, a tablet computer, a Smartphone, a Phablet, and the like.

In an embodiment, the user-computing device 108 may be utilized by a user (e.g., a commuter, a traveler, or a passenger) who may wish to avail a vehicle to commute between at least two stations of the route. The user may utilize a GUI presented on the user-computing device 108 to raise a travel request pertaining to his/her travel schedule along the route. For example, the travel request may comprise at least one or more of, but not limited to, a source station, a destination station, a time instant at which the user may expect the vehicle at the source station, and a waiting time threshold (i.e., a tolerance time) up to which the user may wait for the vehicle at the source station. The user-computing device 108 may transmit the travel request raised by the user to the database server 102, and the application server 104 over the network 110. Further, in an embodiment, the user may utilize the user-computing device 108 to cancel or edit a pending travel request. In an embodiment, the user-computing device 108 may receive the second notification, in response to the travel request, from the application server 104 over the network 110. The second notification may be indicative of at least a confirmation or a rejection of the travel request and/or the updated dispatch schedule corresponding to the vehicles to be dispatched. An example of a GUI displaying the second notification has been explained in FIG. 5.

The user-computing device 108 may correspond to a variety of computing devices such as, but not limited to, a laptop, a PDA, a tablet computer, a Smartphone, a Phablet, and the like.

A person having ordinary skill in the art will understand that the scope of the disclosure is not limited to the utilization of the user-computing device 108 by a single user. In an embodiment, the user-computing device 108 may be utilized by more than one user to raise one or more travel requests, without any deviation from the scope of the disclosure.

The network 110 corresponds to a medium through which content and messages flow among various devices of the system environment 100 (e.g., the database server 102, the application server 104, the vehicle-computing device 106, and the user-computing device 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
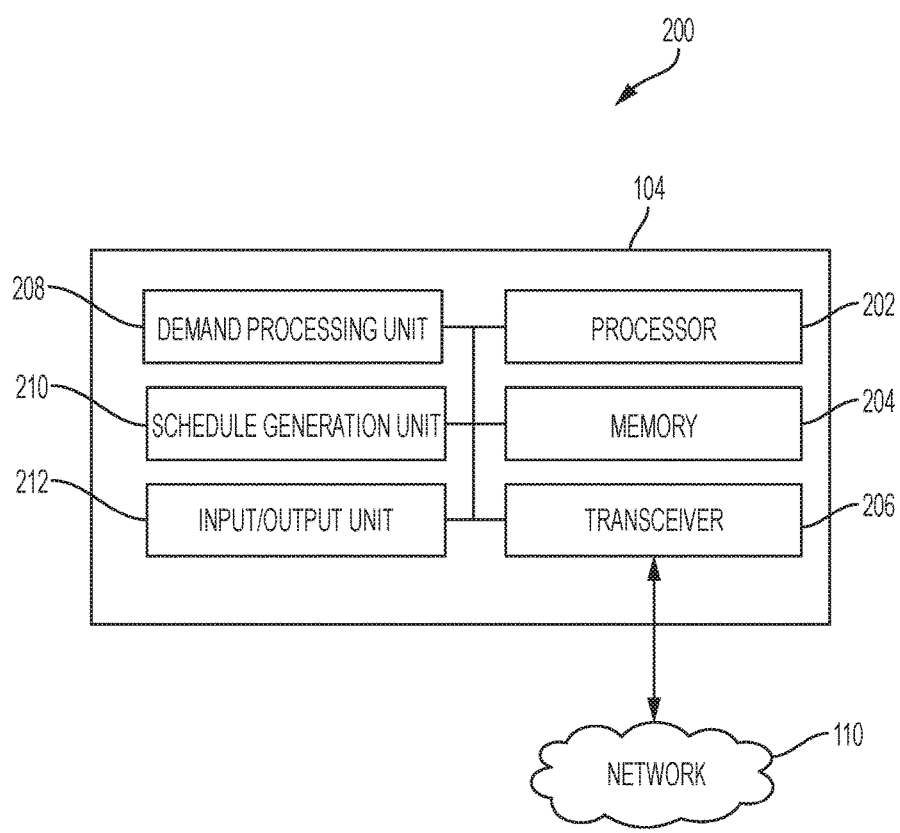
FIG. 2 is a block diagram that illustrates an application server, in accordance with at least one embodiment.

FIG. 2 is a block diagram that illustrates the application server 104, in accordance with at least one embodiment. FIG. 2 has been described in conjunction with FIG. 1. In an embodiment, the application server 104 may include a processor 202, a memory 204, a transceiver 206, a demand processing unit 208, a schedule generation unit 210, and an input/output unit 212.

The processor 202 may be configured to execute one or more sets of instructions stored in the memory 204. The processor 202 is coupled to the memory 204, the transceiver 206, the demand processing unit 208, the schedule generation unit 210, and the input/output unit 212. The processor 202 may further comprise an arithmetic logic unit (ALU) (not shown) and a control unit (CU) (not shown). The ALU may be coupled to the CU. The ALU may be configured to perform one or more mathematical and logical operations and the CU may control the operation of the ALU. The processor 202 may execute a set of instructions/programs/codes/ scripts stored in the memory 204 to perform one or more schedule generation operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the demand processing unit 208, the schedule generation unit 210, and the input/output unit 212. In an embodiment, the memory 204 may include one or more buffers (not shown). The one or more buffers may store at least one or more of the historical demand, the first demand, the current demand, the second demand, information associated with the one or more routes, information associated with a set of constraints, information associated with the one or more performance metrics, the information associated with the one or more vehicles, and the schedule. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the application server 104 to perform the predetermined operations.

The transceiver 206 transmits and receives messages and data to/from various components, such as the database server 102, the vehicle-computing device 106, and the user-computing device 108, of the system environment 100, over the network 110. In an embodiment, the transceiver 206 may be communicatively coupled to the network 110. Examples of the transceiver 206 may include, but are not limited to, an antenna, an Ethernet port, a USB port, or any other port that can be configured to receive and transmit data. The transceiver 206 receives and transmits the demands/content/information/notifications in accordance with the various communication protocols, such as, TCP/IP, UDP, and 2G, 3G, or 4G communication protocols.

The demand processing unit 208 may comprise suitable logic, circuitry, interfaces and/or code that may be configured to execute the one or more instructions stored in the memory 204 to determine the historical demand and the current demand for the one or more vehicles at the one or more stations associated with each route of the one or more routes. In an embodiment, the demand processing unit 208 may be further configured to predict the first demand and the second demand, based on the historical demand and the current demand, respectively. The demand processing unit 208 may be implemented using one or more processor technologies known in the art. Examples of the demand processing unit 208 include, but are not limited to, an X86, a RISC processor, a CISC processor, or any other processor. In another embodiment, the demand processing unit 208 may be implemented as an Application-Specific Integrated Circuit (ASIC) microchip designed for a special application, such as predicting the first demand and the second demand for the one or more vehicles at the one or more time instants.

The schedule generation unit 210 may comprise suitable logic, circuitry, interfaces and/or code that may be configured to execute the one or more instructions stored in the memory 204 to generate the dispatch schedule to dispatch the one or more vehicles along each route of the one or more routes at the one or more time instants. In an embodiment, the schedule generation unit 210 may further update the generated dispatch schedule based on the second demand. In an embodiment, the schedule generation unit 210 may utilize one or more techniques to generate the dispatch schedule, such as, but not limited to, the Integer Linear programming (ILP) technique. Further, the schedule generation unit 210 may utilize one or more techniques to update the generated dispatch schedule for the current time instant, such as, but not limited to, the Model Predictive Control (MPC) technique. The schedule generation unit 210 may be implemented using one or more processor technologies known in the art. Examples of the schedule generation unit 210 include, but are not limited to, an X86, a RISC processor, a CISC processor, or any other processor. In another embodiment, the schedule generation unit 210 may be implemented as an Application-Specific Integrated Circuit (ASIC) microchip designed for a special application, such as updating the dispatch schedule, to dispatch the one or more vehicles, for the current time instant based on the second demand predicted at the current time instant.

The input/output unit 212 may comprise suitable logic, circuitry, interfaces, and/or code that may be configured to receive the request or provide an output to the user. The input/output unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The working of the application server 104 to dispatch the one or more vehicles on the one or more routes has been explained later in FIG. 3.

Figure 3:
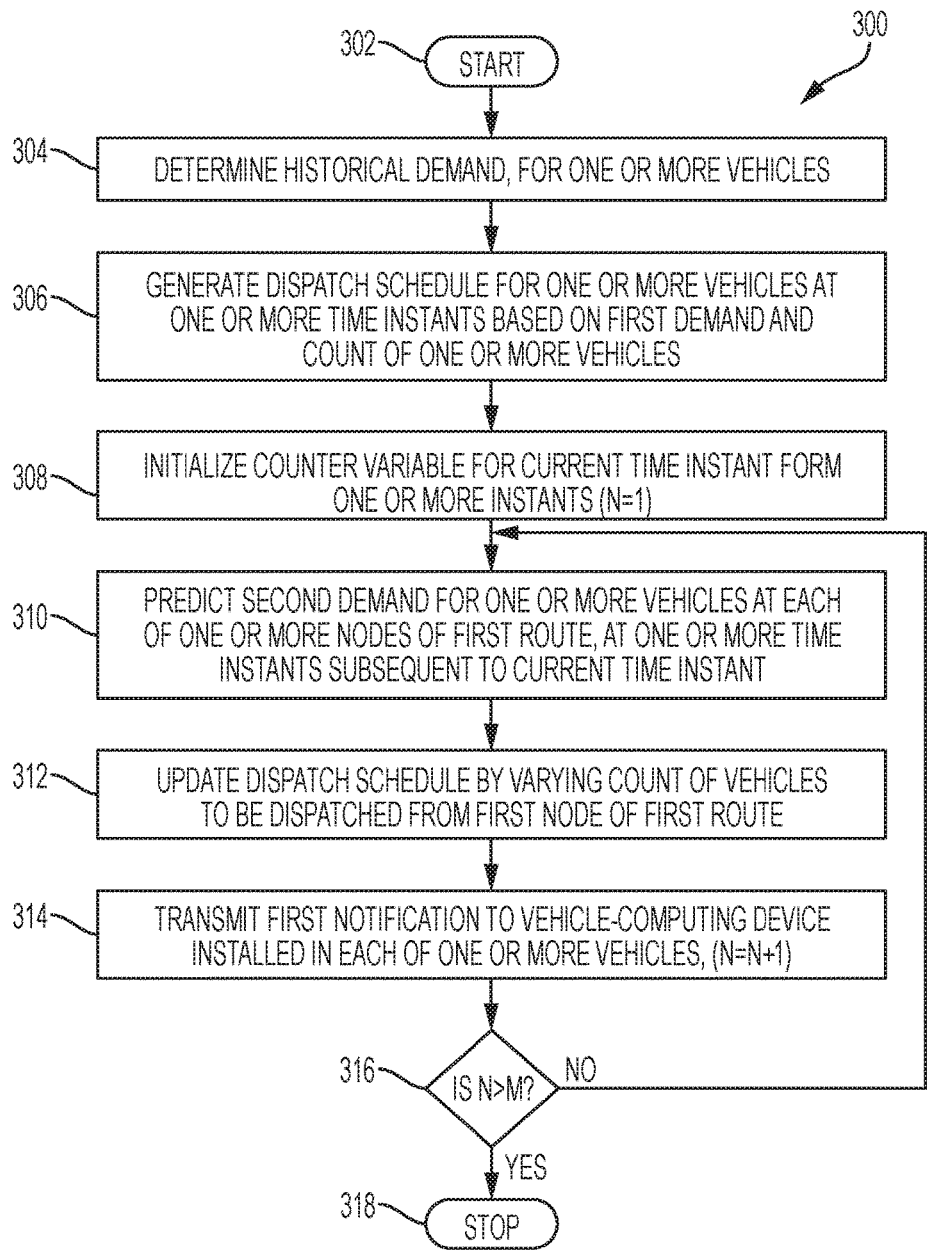
FIG. 3 is a flowchart that illustrates a method for managing a dispatch of vehicles based on generation of a dispatch schedule, in accordance with at least one embodiment.

FIG. 3 is a flowchart 300 illustrating a method for managing the dispatch of the one or more vehicles based on generation of the dispatch schedule, in accordance with at least one embodiment. The flowchart 300 has been described in conjunction with FIG. 1 and FIG. 2. The method starts at step 302.

For the purpose of the ongoing description, hereinafter, the method has been explained with respect to a first route in the one or more routes. However, the scope of the disclosure should not be construed limiting to the first route. In an embodiment, the following steps can also be performed for the remaining one or more routes.

At step 304, the historical demand for the one or more vehicles may be determined. In an embodiment, the demand processing unit 208 in conjunction with the processor 202 may be configured to determine the historical demand for the one or more vehicles. In an embodiment, the demand processing unit 208 may determine the historical demand at the one or more other time instants, such that the one or more other time instants are temporally prior to the one or more time instants.

In an embodiment, the demand processing unit 208 may be configured to extract the information pertaining to the one or more time instants from the database server 102. In an embodiment, the information pertaining to the one or more time instants may comprise the one or more time instants at which the one or more vehicles are to be dispatched from the first station of the first route. In an embodiment, the processor 202 may be configured to determine the one or more time instants based on a count of the one or more travel requests received and/or a revenue trend generated at various time instants in the past. For example, the processor 202 may determine the count of the one or more travel requests received at various time instants in a day and/or the revenue trend corresponding to the day generated by the one or more vehicles, corresponding to a first route. Further, the processor 202 may identify a predefined count (e.g., six) of time instants in a day at which the highest counts of the one or more travel requests is received and/or the highest revenue is generated. In such a scenario, the six time instants identified by the processor 202 may correspond to the one or more time instants.

In an alternate embodiment, the service provider of the one or more vehicles may store the information pertaining to the one or more time instants in the database server 102 by utilizing the agent-computing device (not shown). For example, the service provider may determine five time instants in a day, (i.e., "8:00 AM," "10:00 AM," "12:00 PM," "2:00 PM," and "4:00 PM") to dispatch the one or more vehicles from the first station of the first route. Thereafter, the service provider may store the information pertaining to the five time instants in the database server 102. Thereafter, the demand processing unit 208 may be configured to determine the historical demand for the one or more vehicles, along the first route, at the one or more time instants.

In an embodiment, the demand processing unit 208 may determine the historical demand, at the one or more time instants, based on the user profile associated with the one or more users. Prior to the determination of the historical demand the demand processing unit 208 may be configured to extract information pertaining to the first route, such as, the one or more stations in the first route, and a trip time associated with the first route from the database server 102. In an embodiment, the demand processing unit 208 may extract the user profile of each of the one or more users from the database server 102. Thereafter, the demand processing unit 208 may determine the first count of the one or more users that commuted along the first route at the one or more other time instants based on the user profile of each of the one or more users. In an embodiment, the one or more other time instants may be temporally prior to the one or more time instants. The demand processing unit 208 may determine the first count of the one or more users based on the travel history in the user profile of each of the one or more users. The demand processing unit 208 may utilize the sign-in and/or the sign-out details of each of the one or more users to determine the first count of the one or more users. In an embodiment, the demand processing unit 208 may utilize the sign-in and/or the sign-out details over a predefined time period to determine the first count of the one or more users.

For example, the demand processing unit 208 may extract the user profile of four users from the database server 102 to determine the historical demand for a first route (i.e., NODE_1->NODE_2->NODE_3) at the one or more time instants (e.g., one or more time instants on Nov. 4, 2016). The demand processing unit 208 may determine the first count of users from the four users that commuted along the first route (i.e., NODE_1->NODE_2->NODE_3) at the one or more other time instants (e.g., on one or more other time instants on Nov. 3, 2016). Table 1 illustrates the user profile of four users extracted from the database server 102.

TABLE 1

Illustration of the user profile of four users extracted from a database server

| User id | Source station | Destination station | Sign in Date (MM-DD-YY) | Sign in Time (as per 12-hour clock) (HH:MM) | Sign out Date (MM-DD-YY) | Sign out Time (as per 12-hour clock) (HH:MM) |
|---|---|---|---|---|---|---|
| User_1 | NODE_1 | NODE_3 | 11-03-16 | 10:00 AM | 11-03-16 | 11:00 AM |
| | NODE_3 | NODE_1 | 11-03-16 | 05:00 PM | 11-03-16 | 06:00 PM |
| User_2 | NODE_1 | NODE_3 | 11-03-16 | 10:00 AM | 11-03-16 | 11:00 AM |
| | NODE_4 | NODE_6 | 11-03-16 | 11:00 AM | 11-03-16 | 12:00 PM |
| User_3 | NODE_4 | NODE_6 | 11-03-16 | 11:00 AM | 11-03-16 | 12:00 PM |
| | NODE_6 | NODE_4 | 11-03-16 | 03:00 PM | 11-03-16 | 04:00 PM |

TABLE 1-continued

Illustration of the user profile of four users extracted from a database server

| User id | Source station | Destination station | Sign in | | Sign out | |
|---|---|---|---|---|---|---|
| | | | Date (MM-DD-YY) | Time (as per 12-hour clock) (HH:MM) | Date (MM-DD-YY) | Time (as per 12-hour clock) (HH:MM) |
| User_4 | NODE_6 | NODE_4 | 11-03-16 | 03:00 PM | 11-03-16 | 04:00 PM |
| | NODE_3 | NODE_1 | 11-03-16 | 05:00 PM | 11-03-16 | 06:00 PM |

Referring to Table 1, based on the extracted user profile, the demand processing unit 208 may determine that on Nov. 3, 2016, two users commuted along the first route (i.e., NODE_1->NODE_2->NODE_3) at "10:00 AM". Further, the demand processing unit 208 may determine the first count of the one or more users (i.e., two users, User_1 and User_2) who commuted along the first route at a first other time instant in the one or more other time instants (i.e., "10:00 AM" on Nov. 3, 2016). Thus, the demand processing unit 208 may determine the historical demand corresponding to a first time instant in the one or more time instants (i.e., "10:00 AM" on Nov. 4, 2016) as two users (i.e., the first count of the one or more users). Similarly, the demand processing unit 208 may determine the historical demand corresponding to the one or more stations in the first route at the remaining one or more time instants.

In another embodiment, the processor 202 may extract the historical demand from databases of other transportation agencies that keep a record of the one or more travel requests raised by the one or more users. In an embodiment, the demand processing unit 208 may be configured to store the historical demand in the database server 102, over the network 110. A person having ordinary skill in the art will understand that the above example is for illustrative purposes and should not be construed to limit the scope of the disclosure.

At step 306, the dispatch schedule for the one or more vehicles at the one or more time instants is generated based on the first demand and the count of the one or more vehicles on a specific route. In an embodiment, the schedule generation unit 210, in conjunction with the processor 202, may be configured to generate the dispatch schedule for the one or more vehicles at the one or more time instants, based on the first demand and the count of the one or more vehicles corresponding to the first route. In an embodiment, the dispatch schedule comprises at least the count of vehicles from the one or more vehicles to be dispatched from the first station of the first route at the corresponding time instant. Prior to the generation of the dispatch schedule, the transceiver 206 may query the database server 102 to receive the count of the one or more vehicles, the set of constraints, the one or more performance metrics, the information pertaining to the one or more time instants, and the historical demand. In an embodiment, the demand processing unit 208 may be configured to predict the first demand for the one or more vehicles at the one or more time instants based on the historical demand.

To predict the first demand for the one or more vehicles, the demand processing unit 208 may predict a second count of the one or more users based on the historical demand. In an embodiment, the second count of the one or more users are predicted to commute along the first route at the one or more time instants. In an embodiment, the demand processing unit 208 may utilize one or more prediction algorithms, such as, but not limited to, logistic regression algorithm and predictive modelling algorithm, for predicting the first demand. In an embodiment, the demand processing unit 208 may query the database server 102 to receive the historical demand corresponding to the one or more time instants over the predefined time period. Thereafter, the demand processing unit 208 may determine a median historical demand for each of the one or more time instants, such that the median historical demand may correspond to the first demand. For example, the demand processing unit 208 may query the database server to receive the historical demand for a first time instant (e.g., "10:00 AM") in the one or more time instants over the predefined time interval (e.g., past 10 days). Based on the historical demand (e.g., 10 users, 8 users, 10 users, 9 users, 7 users, 11 users, 10 users, 9 users, 12 users, and 11 users) received, the demand processing unit 208 may determine the median historical demand (i.e., 10 users). Thereafter, the demand processing unit 208 may predict the second count of the one or more users, corresponding to the first time instant, based on the median historical demand (i.e., 10 users). Similarly, the first demand for the one or more vehicles at the remaining one or more time instants may be predicted.

Thereafter, the schedule generation unit 210 may generate the dispatch schedule based on the first demand and the count of the one or more vehicles. In an embodiment, the dispatch schedule comprises the count of vehicles from the one or more vehicles to be dispatched from the first station of the first route at the one or more time instants. In an embodiment, the schedule generation unit 210 may utilize an Integer Linear Programming (ILP) technique to generate the dispatch schedule. In an embodiment, the schedule generation unit 210 may formulate an ILP problem to determine the count of vehicles from the one or more vehicles to be dispatched at the one or more time instants. The schedule generation unit 210 may formulate the ILP problem in such a manner that one or more of the one or more performance metrics are optimized. The optimization of one or more of the one or more performance metrics may comprise maximizing the demand served by the one or more vehicles, minimizing the count of vehicles dispatched from the one or more vehicles, minimizing the count of trips made by the one or more vehicles along the first route, maximizing the revenue generated and/or minimizing the average user waiting time. In an embodiment, the service provider associated with the one or more vehicles may store the set of constraints in the database server 102, utilizing the agent computing device (not shown).

In an exemplary implementation, the schedule generation unit 210 may formulate an ILP problem for the dispatch schedule generation using the following conditions:

$$\text{Maximize}_{x_d, y_b, z_{st}} \Sigma_{d \in D} x_d \quad (1)$$

$$\text{subject to } x_d \in \{0, n_d\} \, \forall d \in D \quad (2)$$

$$y_b \in \{0, \Sigma_{r \in R: r \in b} m_r\} \, \forall d \in D \quad (3)$$

$$z_{st} \in \{0, \Sigma_{r \in R} m_r\} \, \forall s \in S, t \in T \quad (4)$$

$$z_{st} = \Sigma_{\{b \in B | s \in r, r \in b, t-v^{-1} d_r(r(1),s) \in b\}} y_b \, \forall s \in S, t \in T \quad (5)$$

$$\Sigma_{\{b \in B: r \in b, t_b \leq t \leq t_b + RTT(r) \text{ where } t_b \in b\}} y_b \leq m_r \, \forall t \in T, \forall r \in R \quad (6)$$

$$\Sigma_{\{d \in D: \exists r \in R \text{ such that } (s_d, s, e_d) \in r, t = t_d + v^{-1} d_r(s_{d,s})\}} x_d \leq c^* z_{st} \, \forall s \in S, t \in T \quad (7)$$

where,

T: represents the one or more time instants at which the vehicles from the one or more vehicles are to be dispatched on the first route. For example, $T=\{t_1, t_2, t_3\}$;

R: represents the first route, comprising the one or more stations, on which the vehicles from the one or more vehicles are to be dispatched. For example, $r=\{s_1, s_2, s_3, s'_1\}$: $r \in R$;

S: represents the one or more stations (i.e., $S=\{s_1, s_2, s_3, s'_1\}$) in the first route R;

D: represents a set of first demand vectors corresponding to the first route. For example, for the first route, $r=\{s_1, s_2, s_3, s'_1\}$ and the one or more time instants, $t=\{t_1, t_2, t_3\}$, the set of first demand vectors may be $\{(s_1, s_2, t_1, t_2), (s_2, s_3, t_1, t_2), (s_3, s'_1, t_1, t_2), (s_1, s_2, t_2, t_3), (s_2, s_3, t_2, t_3), \text{ and } (s_3, s'_1, t_2, t_3)\}$.

$n_d$: represents a first count of the one or more users corresponding to a first demand vector (d) in the set of first demand vectors (D). For example, for a first demand vector, $d:(s_i, s_j, t_k, t_l)$, $n_d$ represents the first count of one or more users that are predicted to commute from a source station $s_i$ to a destination station $s_j$, such that the first count of the one or more users is expected to arrive between a time interval of $t_k$ and $t_l$;

$N_D$: represents a set of the first count of the one or more users corresponding to the set of first demand vectors, such that $N_D := \{n_d : d \in D\}$;

$x_d$: represents one or more users of type d (i.e., a set of first users from the one or more users) that may be feasibly served by the dispatch schedule;

B: represents a possible set of the one or more routes and the corresponding one or more time instants;

b=represents the first route and the one or more time instants at which the vehicles from the one or more vehicles are to be dispatched from the first station of the first route, such that $b=\{(r,t): r=\{s_1, s_2, s_3, s'_1\}, t \in \{t_1, t_2, t_3\}\}$ and $b \in B$;

$y_b$: represents the vehicles from the one or more vehicles that are to be dispatched from the first station of the first route at the one or more time instants, such that $b \in B$;

c: represents a capacity of a vehicle in the one or more vehicles; and $m_r$: represents the count of the one or more vehicles to be dispatched along the first route (r).

As shown above, the ILP problem is represented in equation (1), while the set of constraints (as specified by the service provider) to the ILP problem is represented in equations (2)-(7). In an embodiment, an aim of the ILP problem (equation (1)) is to maximize the demand served by the one or more vehicles along the first route. Equation (2) represents a range of demands that may be feasibly served corresponding to a demand vector such as the first demand vector (d). Equation (3) represents a range of the count of vehicles from the one or more vehicles that may be dispatched from the first station of the first route at the one or more time instants, such that the count of the vehicles dispatched may not exceed the count of the one or more vehicles. Equation (5) defines a variable $z_{st}$ which is a latent variable that denotes the count of vehicles at a time instant t at a station s and equation (4) represents the range of $z_{st}$. Equation (6) represents that the count of vehicles dispatched from the one or more vehicles is at most the count of the one or more vehicles. Further, equation (7) represents that the first demand served by the dispatched vehicles at the station s at the time instant t is limited by the capacity of the dispatched vehicles at the station s at the time instant t (i.e., an upper bound on the demand served by the one or more vehicles).

In another embodiment, the schedule generation unit 210 may formulate another ILP to generate the dispatch schedule such that the count of trips made by the one or more vehicles on the first route is minimized and the demand served is maximized. In an embodiment, the processor 202 may formulate such an ILP problem using the following conditions:

$$\text{Maximize} \Sigma_{d \in D} x_d - \alpha \Sigma_{b \in B} y_b, \text{ where } \alpha > 0 \quad (8)$$

$$\text{subject to } x_d \in \{0, n_d\} \, \forall d \in D \quad (9)$$

$$y_b \in \{0, \Sigma_{r \in R: r \in b} m_r\} \, \forall d \in D \quad (10)$$

$$z_{st} \in \{0, \Sigma_{r \in R} m_r\} \, \forall s \in S, t \in T \quad (11)$$

$$z_{st} = \Sigma_{\{b \in B | s \in r, r \in b, t-v^{-1} d_r(r(1),s) \in b\}} y_b \, \forall s \in S, t \in T \quad (12)$$

$$\Sigma_{\{b \in B: r \in b, t_b \leq t \leq t_b + RTT(r) \text{ where } t_b \in b\}} y_b \leq m_r \, \forall t \in T, \forall r \in R \quad (13)$$

$$\Sigma_{\{d \in D: \exists r \in R \text{ such that } (s_d, s, e_d) \in r, t = t_d + v^{-1} d_r(s_{d,s})\}} x_d \leq c^* z_{st} \, \forall s \in S, t \in T \quad (14)$$

In an embodiment, the schedule generation unit 210 may determine a solution for the ILP problems specified by equation (1) and equation (8), subject to the set of constraints of equations (2)-(7) and (9)-(14), respectively, using any ILP solving technique known in the art. The solution to the ILP problem may be deterministic of the count of vehicles from the one or more vehicles that may be dispatched at the one or more time instants from the first station of the first route, i.e., the dispatch schedule, such that the one or more performance metrics are optimized.

A person having ordinary skill in the art will understand that the abovementioned exemplary implementations are for illustrative purpose and should not be construed to limit the scope of the disclosure.

In an embodiment, the schedule generation unit 210 may be configured to store the dispatch schedule in the database server 102 over the network. For example, Table 2 illustrates a dispatch schedule generated by the schedule generation unit 210 for a first route (e.g., NODE_1->NODE_2->NODE_3->NODE_1) with a round trip time of "3 hours". The count of the one or more vehicles (e.g., V_1, V_2, V_3, V_4, V_5, V_6, V_7, V_8, V_9, and V_10) may be 10.

TABLE 2

A dispatch schedule for managing the dispatch of the vehicles from the one or more vehicles at the one or more time instants from the first station of the first route.

| Time instant of dispatch (as per 12 hour clock) (HH:MM) | First demand | Capacity of each vehicle | Count of vehicles dispatched | Vehicle id of the dispatched vehicles | Count of the remaining vehicles | Time instant of return of dispatched vehicles |
|---|---|---|---|---|---|---|
| 8:00 AM | 30 | 10 | 3 | V_1, V_2, V_3 | 10 − 3 = 7 | 11:00 AM |
| 10:00 AM | 38 | 10 | 4 | V_4, V_5, V_6, V_7 | 7 − 4 = 3 | 1:00 PM |
| 12:00 AM | 45 | 10 | 5 | V_8, V_9, V_10, V_1, V_2 | (3 + 3) − 5 = 1 | 3:00 PM |
| 2:00 PM | 29 | 10 | 3 | V_3, V_4, V_5 | (1 + 4) − 3 = 2 | 5:00 PM |
| 4:00 PM | 48 | 10 | 5 | V_6, V_7, V_8, V_9, V_10 | (2 + 5) − 5 = 2 | 7:00 PM |
| 6:00 PM | 49 | 10 | 5 | V_1, V_2, V_3, V_4, V_5 | (2 + 3) − 5 = 0 | 9:00 PM |

With reference to Table 2, the schedule generation unit 210 may generate the dispatch schedule based on the first demand at each of the one or more time instants (e.g., "8:00 AM," "10:00 AM," "12:00 PM," "2:00 PM," "4:00 PM," and "6:00 PM") for the first route. The schedule generation unit 210 may determine the count of the remaining vehicles based on the count of vehicles dispatched and a count of vehicles that returned after completing the trip on the first route. For example, the schedule generation unit 210 may determine that at time instant "2:00 PM," four vehicles that were dispatched at "10:00 PM" will return from the trip and might be available for dispatch at "2:00 PM". Therefore, the count of remaining vehicles at "2:00 PM" may be determined as "2," (i.e., {(the count of vehicles remaining at "12:00 PM")+(the count of vehicles returned that were dispatched at "10:00 AM")−(the count of vehicles are dispatched at "2:00 PM")}).

A person having ordinary skill in the art will understand that the abovementioned example is for illustrative purpose and should not be construed to limit the scope of the disclosure.

At step 308, a counter variable is initialized for the current time instant from the one or more time instants. In an embodiment, the processor 202 may be configured to initialize the counter variable (i.e., N=1) for the current time instant from the one or more time instants and proceed to step 310. In an embodiment, the processor 202 may be configured to determine a count of the one or more time instants (i.e., "m") associated with a day. For example, the service provider may want to dispatch the one or more vehicles after every two hours between a time duration (e.g., "8:00 AM" to "6:00 PM"). In this scenario, the processor 202 may determine the count of the one or more time instants (e.g., "8:00 AM," "10:00 AM," "12:00 PM," "2:00 PM," "4:00 PM," and "6:00 PM") as six (i.e., M=6).

At step 310, the second demand for the one or more vehicles is predicted at each of the one or more stations of the first route, at the one or more time instants subsequent to the current time instant. In an embodiment, the demand processing unit 208 may predict the second demand for the one or more vehicles at each of the one or more stations of the first route at the time instants subsequent to the current time instant. In an embodiment, the demand processing unit 208 may be configured to predict the second demand based on the current demand.

To predict the second demand, the demand processing unit 208 may be configured to receive the current demand from the one or more sensors installed at the one or more stations of the first route. The current demand may correspond to a third count of the one or more users, such that the third count of the one or more users are scheduled to commute along the first route or a part of the first route at the current time instant. In an embodiment, a user may board the vehicle from the first station of the first route. In another embodiment, another user may board the dispatched vehicles from an intermediate station of the first route. Thus, the demand processing unit 208 may be configured to determine the current demand corresponding to each station in the first route. For example, ten users may raise a travel request for travelling between "NODE_1" and "NODE_3" at the current time instant, and five users may raise a travel request for travelling between "NODE_2" and "NODE_3" at the current time instant. In this scenario, the demand processing unit 208 may determine the current demand as fifteen users.

In an embodiment, the current demand may be associated with the one or more pre-booked travel requests and the one or more real time travel requests corresponding to the current time instant. In an embodiment, the demand processing unit 208 may be configured to receive the one or more pre-booked travel requests at least before the first pre-defined time period prior to a date of travel. Further, in an embodiment, the demand processing unit 208 may be configured to receive the one or more real time travel requests at least before the second pre-defined time period prior to the current time instant. In an embodiment, the demand processing unit 208 may be configured to query the database server 102 to extract the one or more pre-booked travel requests and the one or more real time travel requests.

In an embodiment, the demand processing unit 208 may associate the one or more real time travel requests with a time instant temporally subsequent to the current time instant, if the one or more real time travel requests are raised, when the second pre-defined time period associated with the current time instant has lapsed. For example, a second pre-defined time period associated with the current time instant (e.g., "10:00 AM") may be "1 hour and 50 minutes". Thus, the real time travel requests raised during "8:00 AM" to "9:50 AM" are the one or more real time requests for the current time instant (i.e., "10:00 AM"). In this scenario, travel requests that are raised after "9:50 AM" are associated with the current demand at the time instant (i.e., "12:00 PM") temporally subsequent to the current time instant.

In another embodiment, the demand processing unit 208 may be further configured to determine the current demand based on an unrealized demand associated with the time instant temporally prior to the current time instant. In an embodiment, the unrealized demand may be associated with a set of second users, such that demand of the set of second users was not met at the time instant temporally prior to the current time instant. For example, if demand at the time instant temporally prior to the current time instant was not met due to lack of resources (i.e., less capacity in the vehicles dispatched compared with the demand), the unmet demand may correspond to the unrealized demand. Further, the demand processing unit 208 may associate the unrealized demand with the current demand at the current time instant. Thereafter, based on the current demand (i.e., the third count of the one or more users and the set of second users) at the current time instant (i.e., $t_c$), the demand processing unit 208 may predict the second demand. For example, a user may have raised a travel request for a vehicle at a time $t_r$ (i.e., $t_r<t_c$) to commute from a first station to a second station along a first route. Due to lack of resources, the travel request of the user may not be served at the time instant $t_r$. In such a case, the travel request may correspond to the unrealized demand at $t_r$. Further, the travel request of the user may be associated with the current time $t_c$. Thus, the travel request may correspond to the current demand at $t_c$.

In an embodiment, the one or more users may specify the tolerance time, when the travel request is raised by utilizing the commuter-computing device 108. The tolerance time associated with the travel request of each of the one or more users may be indicative of a time duration up to which a user may further wait for the vehicle on the source station, if the travel request is not served at the time of request. In such a case, if the travel request of the user is not served after the tolerance time has expired the travel request may not correspond to the current demand. In an embodiment, a user may raise a travel request for a vehicle at a time $t_r$ for a travel from a first station to a second station along a first route. A tolerance time associated with the travel request is $t_d$. In such a case, the user may wait for the vehicle until $t_r+t_d$. Thus, the travel request may be served at any time between $t_r$ and $t_r+t_d$, but not before $t_r$ or after $t_r+t_d$. Therefore, the travel request may not correspond to the current demand at the current time instant after $t_r+t_d$.

For example, a user may raise a travel request for commuting between two stations. The time of travel as requested by the user is "2:00 PM" and the tolerance time specified by the user is "45 minutes". In this scenario, the user may wait up to "2:45 PM" for the travel request to be served. Therefore, if there is no scheduled dispatch of the vehicles after "2:00 PM" and prior to "2:45 PM," the user may leave the source station. In such a scenario, the unmet demand of the corresponding user may not be associated with the current demand at a time instant after "2:45 PM."

A person having ordinary skill in the art will understand that the abovementioned example is for illustrative purpose and should not be construed to limit the scope of the disclosure.

In an embodiment, the demand processing unit 208 may utilize one or more data prediction techniques for the prediction of the second demand, such as but not limited to, logistic regression algorithm, and predictive modelling algorithm. In an embodiment, the second demand may be associated with a fourth count of the one or more users, which are predicted to commute along the first route at each of the one or more time instants (e.g., "12:00 PM," "2:00 PM," "4:00 PM," and "6:00 PM") subsequent to the current time instant (e.g., "10:00 AM"). Further, the schedule generation unit 210 may be configured to generate a new dispatch schedule based on the second demand. In an embodiment, the new dispatch schedule is generated for the current time instant and the time instants temporally subsequent to the current time instant. Thereafter, the schedule generation unit 210 may utilize the current demand, the second demand and a count of remaining vehicles at the current time instant to generate the new dispatch schedule at the current time instant. The new dispatch schedule comprises a new count of vehicles from the one or more vehicles to be dispatched from the first station of the first route at the current time instant and each of the time instants temporally subsequent to the current time instant.

In an embodiment, the schedule generation unit 210 may utilize one or more techniques for the generation of the new dispatch schedule, such as, but not limited to, Model predictive control (MPC) technique. In an embodiment, the schedule generation unit 210 may formulate an optimal control problem for MPC technique to determine the new count of vehicles from the one or more vehicles to be dispatched at the current time instant and the time instant temporally subsequent to the current time instant. In an alternate embodiment, the schedule generation unit 210 may solve the formulated optimal control problem using ILP technique. The schedule generation unit 210 may formulate the optimal control problem in such a manner that the one or more performance metrics are optimized. The optimization of the one or more performance metrics may comprise maximizing the demand served by the one or more vehicles, minimizing the count of vehicles dispatched from the one or more vehicles, minimizing the count of trips made by the one or more vehicles along the first route, maximizing the revenue generated and/or minimizing the average user waiting time.

In an exemplary implementation, the schedule generation unit 210 may formulate an optimal control problem for the generation of the new dispatch schedule using the following conditions:

$$Y^*_t(N(t)) \in \min_{y_t \in Y} H_t \Sigma_{K=0}^{H_t-1} q(N_{t+k}, y_{t+k}) \tag{15}$$

$$\text{subject to } N_t = N(t) \tag{16}$$

$$N_{t+k} \in N \tag{17}$$

$$y_{t+k} \in Y \tag{18}$$

$$Y_t = [y_t, y_{t+1}, y_{t+2}, \ldots, y_{t+H_t-1}] \tag{19}$$

where,

N(t): represents an initial condition of the optimal control problem, such that the initial condition corresponds to a set comprising an initial demand (i.e., $N_D(t)$) at the current time instant (t) and the one or more vehicles available at the current time instant for dispatch (i.e., $m_r$:r∈R). The initial demand may further comprise the current demand at "t" and the second demand for the time instants temporally subsequent to "t", i.e., "t+1", "t+2", and so on, predicted at "t", $Y_t$: represents the dispatch schedule corresponding to the current time instant and the time instants temporally subsequent to the current time instant (t), such that $Y_t$ may comprise a union of the first demand for time instants subsequent to the current time instant (t) (i.e., $\{x_d\}_{\{t_d > t: d \in D\}}$), and the count of vehicles from the one or more vehicles that are scheduled to be dispatched at the time instants temporally subsequent to "t" (i.e., $\{y_b\}_{\{t_b \geq t, b \in B\}}$), q( ): represents a performance metrics that may be optimized by the new dispatch schedule, and $Y^*_t$: represents the new dispatch schedule generated at the current time instant (t), such that $Y^*_t$ comprises the new count of the vehicles from the one or more vehicles that are to be dispatched at the current time instant and the time instants temporally subsequent to the current time instant.

In an alternate exemplary implementation, the schedule generation unit 210 may utilize equations (1)-(7) for the generation of the new dispatch schedule by incorporating following additional constraints:

$$x_d = \min(x_d(t-1), n_d(t)) \forall d \in D, t_d < t \quad (20)$$

$$y_b = y_b(t-1) \forall b \in B, t_b < t \quad (21)$$

$$n_d(t) = n_d(t) + \max(n_d(t-1) - x_d(t-1), 0) \quad (22)$$

where, $n_d(t)$: represents the current demand at the current time instant (t) and the unrealized demand at the time instant temporally prior to the current time instant.

In an embodiment, the schedule generation unit 210 may be configured to store the new dispatch schedule in the database server 102 over the network.

For example, Table 3 illustrates a new dispatch schedule generated by the schedule generation unit 210 for a first route (e.g., NODE_1->NODE_2->NODE_3->NODE_1) with a round trip time of "3 hours". The count of the one or more vehicles (e.g., V_1, V_2, V_3, V_4, V_5, V_6, V_7, V_8, V_9, and V_10) may be 10.

the time instant prior to the current time instant (i.e., "8:00 AM") three vehicles were dispatched from the first station of the first route. Comparing the predicted first demand (i.e., 38) at "10:00 AM" and the current demand (i.e., 29) at "10:00 AM", the schedule generation unit 210 may determine a new count of the vehicles to be dispatched from the first station of the first route at the current time instant (i.e., 3). Further, based on the second demand predicted for the time instant temporally subsequent to the current time instant the new count of the vehicles to be dispatched may be determined. At "6:00 PM," as illustrated in Table 3, the predicted second demand is more than the capacity of the available vehicles. Therefore, a portion of the second demand corresponding to "6:00 PM" may be unmet (i.e., (67−(10*6))=7), (i.e., the set of second users).

A person having ordinary skill in the art will understand that the above mentioned exemplary techniques are for illustrative purposes and should not be construed to limit the scope of the disclosure.

At step 312, the dispatch schedule is updated by varying the count of vehicles to be dispatched from the first station of the first route. In an embodiment, the schedule generation unit 210 may be configured to update the dispatch schedule by varying the count of vehicles to be dispatched from the first station. In an embodiment, the dispatch schedule is updated based on the current demand, the second demand and the count of the one or more vehicles. In an embodiment, the schedule generation unit 210 may utilize the new dispatch schedule, i.e., generated based on the current demand, the second demand and the count of the one or more vehicles, to update the dispatch schedule to dispatch the vehicles from the one or more vehicles at the current time instant. In an embodiment, the schedule generation unit 210 may only update the dispatch schedule corresponding to the current time instant.

In an embodiment, the count of the remaining vehicles prior to the dispatch of the vehicles at the current time

TABLE 3

A new dispatch schedule for managing the dispatch of the vehicles from the one or more vehicles at the current time instant and the time instants subsequent to the current time instant from the first station of the first route.

| Time instant of dispatch (as per 12-hour clock) (HH:MM) | Demand | Capacity of each vehicle | Count of vehicles dispatched | Vehicle id of the dispatched vehicles | Count of the remaining vehicles | Time instant of return of dispatched vehicles (as per 12-hour clock) (HH:MM) |
|---|---|---|---|---|---|---|
| 10:00 AM (current time instant) | 29 (current demand) | 10 | 3 | V_4, V_5, V_6 | 7 − 3 = 4 | 1:00 PM |
| 12:00 PM | 38 (second demand) | 10 | 4 | V_7, V_8, V_9, V_10 | (4 + 3) − 4 = 3 | 3:00 PM |
| 2:00 PM | 23 (second demand) | 10 | 3 | V_1, V_2, V_3 | (3 + 3) − 3 = 3 | 5:00 PM |
| 4:00 PM | 39 (second demand) | 10 | 4 | V_4, V_5, V_6, V_7 | (4 + 3) − 4 = 3 | 7:00 PM |
| 6:00 PM | 67 (second demand) | 10 | 6 | V_8, V_9, V_10, V_1, V_2 | (3 + 3) − 6 = 0 | 9:00 PM |

With reference to Table 2 and Table 3, the demand processing unit 208 may receive the current demand (i.e., 29) at the current time instant (i.e., "10:00 AM"). Further, at instant may be zero. In this scenario, no vehicle may be dispatched at the current time instant. Further, the transceiver 206 may transmit the second notification to the one or more users associated with current time instant, displaying a message such as "No scheduled departure at "10:00 AM." In an embodiment, the processor 202 may be configured to identify one or more time instants, when no vehicle is available for dispatch. Further, the processor 202 may be configured to update a log of records, comprising a count of the one or more time instants (when no vehicle is available for dispatch), stored in the database server 102. Further, the processor 202 may compare the count of one or more time instants in the log of records to a predefined threshold (i.e., specified by the service provider). The processor 202 may be configured to refresh the count of the one or more time instants in the log of record after a third predefined time interval (e.g., after every 10 days). In an embodiment, when the count of the one or more time instants in the log of records exceed the predefined threshold, the transceiver 206 may transmit a third notification to the service provider associated with the agent computing device (not shown). In an embodiment, the third notification may comprise a recommendation message to increase the count of the one or more vehicles to cater the unrealized demand. Further, the third notification may also comprise a report comprising information pertaining to loss of revenue that occurred due to the unavailability of resources (i.e., the one or more vehicles).

For example, with reference to Table 2 and Table 3, the schedule generation unit 210 may update the dispatch schedule for the current time instant, such that the schedule generation unit 210 may vary the count of the vehicles in the dispatch schedule (i.e., from 4 vehicles to 3 vehicles). Table 4 illustrates the updated dispatch schedule at the current time instant.

vehicles. In an embodiment, the first notification may comprise information pertaining to the vehicles from the one or more vehicles that are scheduled to dispatch from the first station at the current time instant. Further, on the reception of the first notification, the corresponding vehicles from the one or more vehicles may be dispatched from the first station of the first route at the current time instant.

In an embodiment, the transceiver 206 may be further configured to transmit the second notification to the user-computing device 108 associated with each of the third count of the one or more users, which are scheduled to commute on the first route at the current time instant. In an embodiment, the second notification may comprise information pertaining to the vehicles from the one or more vehicles that are scheduled to dispatch from the first station at the current time instant based on the updated dispatch schedule. In an embodiment, the second notification may comprise a vehicle identification of each of the corresponding vehicle, a time associated with the dispatch of the vehicles, and a capacity of each of the vehicles to be dispatched.

In another embodiment, the second notification may also comprise a seat number of the corresponding vehicle, allotted to a user based on the updated dispatch schedule. An exemplary GUI of the second notification is described later in FIG. 5. In an embodiment, the processor 202 may be further configured to increment the counter variable (i.e., $t=t+1$).

A person having ordinary skill in the art will understand that the scope of the disclosure is not limited to the second notification comprising the information pertaining to the vehicles to be dispatched.

TABLE 4

An updated dispatch schedule for managing the dispatch of the vehicles from the one or more vehicles at the current time instant from the first station of the first route.

| Time instant of dispatch (as per 12-hor clock) (HH:MM) | Demand | Capacity of each vehicle | Count of vehicles dispatched | Vehicle id of the dispatched vehicles | Count of the remaining vehicles | Time instant of return of dispatched vehicles (as per 12-hor clock) (HH:MM) |
|---|---|---|---|---|---|---|
| 10:00 AM (current time instant) | 29 (current demand) | 10 | 3 | V_4, V_5, V_6 | 7 − 3 = 4 | 1:00 PM |
| 12:00 PM | 45 (first demand) | 10 | 5 | V_7, V_8, V_9, V_10, V_1 | (4 + 3) − 5 = 2 | 3:00 PM |
| 2:00 PM | 29 (first demand) | 10 | 3 | V_2, V_3, V_4 | (2 + 3) − 3 = 2 | 5:00 PM |
| 4:00 PM | 48 (first demand) | 10 | 5 | V_5, V_6, V_7, V_8, v-9 | (5 + 2) − 4 = 3 | 7:00 PM |
| 6:00 PM | 49 (first demand) | 10 | 5 | V_10, V_1, V_2, V_3, V_4 | (3 + 3) − 5 = 1 | 9:00 PM |

A person having ordinary skill in the art will understand that the abovementioned example is for illustrative purpose and should not be construed to limit the scope of the disclosure.

A step 314, the first notification is transmitted to the vehicle-computing device 106 installed in each of the one or more vehicles. In an embodiment, the transceiver 206 may be configured to transmit the first notification to the vehicle-computing device 106 installed in each of the one or more At step 316, a check is performed to determine a status of a value of the counter variable. In an embodiment, the processor 202 may be configured to perform a check to determine the status of the value of the counter variable. In an embodiment, if the processor 202 determines that the value of the counter variable is less than or equal to the count of the one or more time instants (i.e., "M"), step 310 is performed. Further, if the processor 202 determines that the value of the counter variable is greater than the count of the one or more time instants (i.e., "M"), step 318 is performed. The method ends at step 318.

Figure 4:
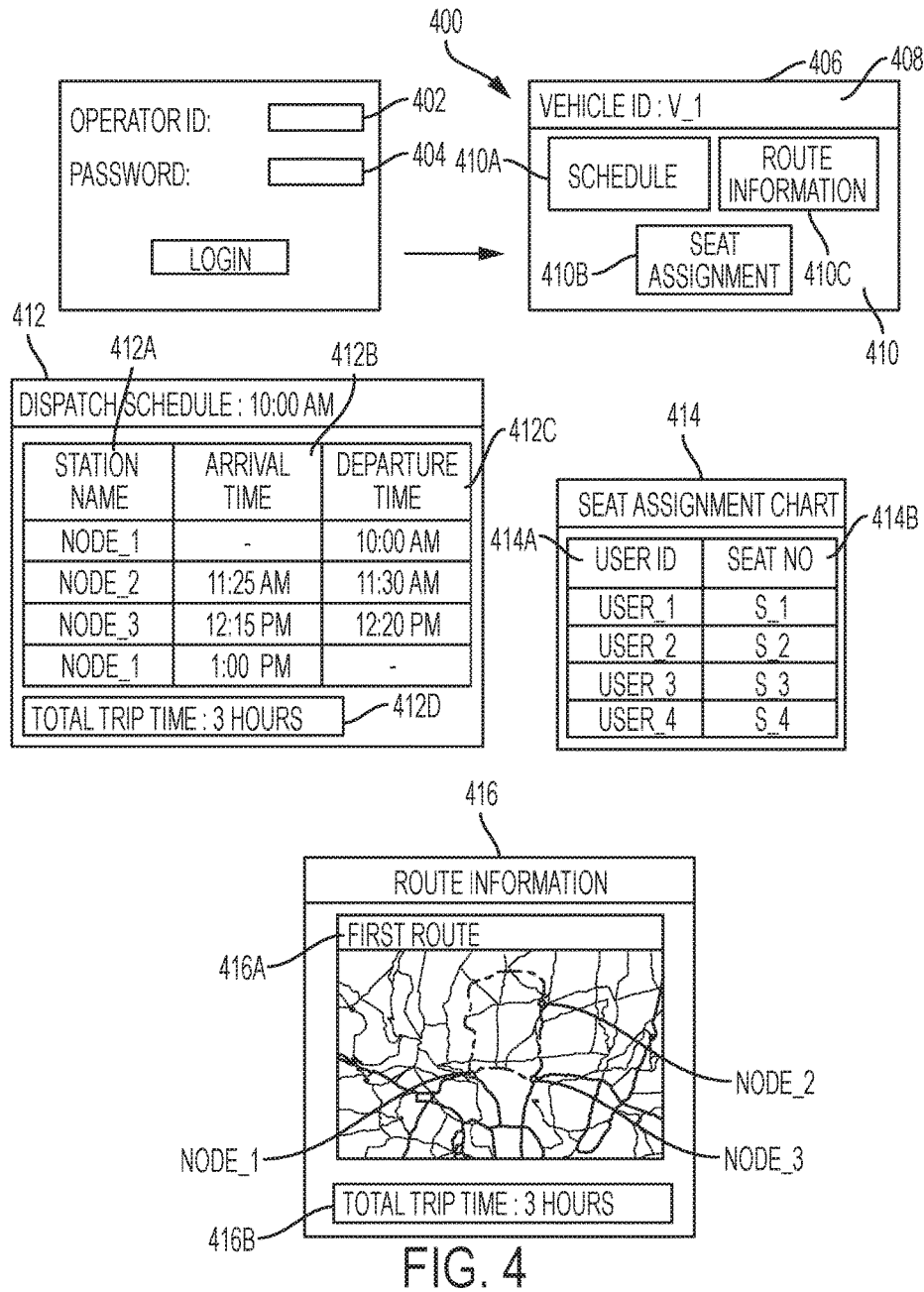
FIG. 4 is a block diagram that illustrates an exemplary Graphical User Interface (GUI) presented on an exemplary vehicle-computing device, when a first notification, comprising the updated dispatch schedule, is transmitted, in accordance with at least one embodiment.

FIG. 4 is a block diagram that illustrates an exemplary GUI presented on an exemplary vehicle-computing device, when the first notification, comprising the updated dispatch schedule, is transmitted, in accordance with at least one embodiment. FIG. 4 is explained in conjunction with FIGS. 1-3.

In an embodiment, the exemplary GUI, such as the GUI 400, may correspond to the first notification transmitted by the transceiver 206 to an exemplary vehicle computing device, such as the vehicle-computing device 106, associated with each of the one or more vehicles. To view the first notification, the operator associated with the corresponding vehicle may be required to login by providing an "OPERATOR ID" and a "PASSWORD" in input boxes 402 and 404, respectively.

After the login, the operator may be presented with the first notification 406. The first notification 406 may comprise a first section 408 and a second section 410. The first section 408 may display a vehicle identification, such as "VEHICLE ID: V_1", of the vehicle associated with the corresponding vehicle-computing device 106. The second section 410 may comprise a "SCHEDULE" tab 410A, a "SEAT ASSIGNMENT" tab 4106, and a "ROUTE INFORMATION" tab 410C.

In an embodiment, the operator may click on the "SCHEDULE" tab 410A to view the updated dispatch schedule 412 associated with the corresponding vehicle "V_1". The updated dispatch schedule 412 may display the current time instant at which the vehicle "V_1" is scheduled to dispatch. The updated dispatch schedule 412 may comprise details of station names, (depicted by a first column 412A), to be traversed by the vehicle "V_1." The updated dispatch schedule 412 may further comprise details pertaining to an arrival time (depicted by a second column 4128) and a departure time (depicted by a third column 412C) of the vehicle "V_1" at each of the one or more stations along the first route. The updated dispatch schedule 412 may further comprise "TOTAL TRIP TIME" (depicted by a section 412D) associated with the first route.

In an embodiment, the operator may click on the "SEAT ASSIGNMENT" tab 410B to view a "SEAT ASSIGNMENT CHART" 414 associated with the corresponding vehicle "V_1." The "SEAT ASSIGNMENT CHART" 414 may display a seat assignment list of the corresponding vehicle "V_1" comprising a "USER ID" (depicted by a first column 414A) and a "SEAT NUMBER" (depicted by a second column 414B) assigned to the corresponding user, such as "USER_1," "USER_2," "USER_3," and "USER_4."

In an embodiment, the operator may click on the "ROUTE INFORMATION" tab 410C to view the "ROUTE INFORMATION" 416 on which the corresponding vehicle "V_1" is to be dispatched at the current time instant. Further, the route information 416 may comprise a geographical map of the first route (depicted by a first section 416A) and a trip time (depicted by a second section 416B) associated with the first route. For example, the vehicle "V_1" may be scheduled to ply on a first route (e.g., NODE_1->NODE_2->NODE_3->NODE_1) and the trip time associated with the first route is three hours. In this scenario, the route information 416 may display the geographical map of the first route (i.e., NODE_1->NODE_2->NODE_3->NODE_1) (depicted by the first section 416A) and the trip time of three hours (depicted by the second section 416B).

A person having ordinary skill in the art will understand that the abovementioned GUI 400 is for illustrative purposes and should not be construed to limit the scope of the disclosure. In an embodiment, the "SEAT ASSIGNMENT" tab 410B may not be available, when the seat allotment to the one or more users is not fixed.

Figure 5:
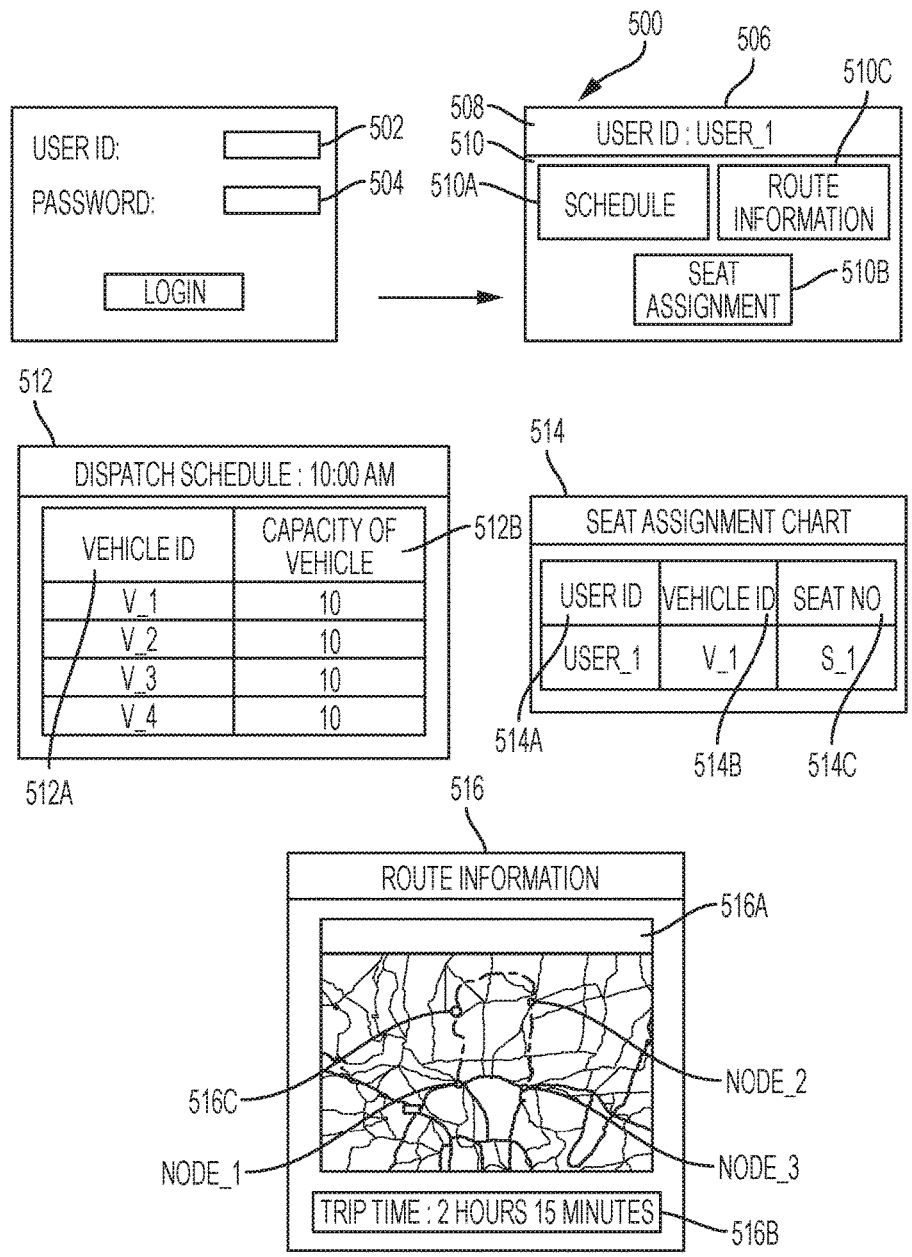
FIG. 5 is block diagram that illustrates another exemplary Graphical User Interface (GUI) presented on an exemplary user-computing device, when a second notification associated with the updated dispatch schedule, is transmitted, in accordance with at least one embodiment.

FIG. 5 is a block diagram that illustrates another exemplary Graphical User-interface (GUI) that may be presented on an exemplary user-computing device, when a second notification associated with the updated dispatch schedule, is transmitted, in accordance with at least one embodiment. FIG. 5 is explained in conjunction with FIGS. 1-3.

In an embodiment, the exemplary GUI, such as the GUI 500, may be associated with the second notification transmitted to the exemplary user-computing device, such as the user-computing device 108, associated with each of the one or more users. To view the second notification, the user associated with the corresponding user-computing device 108 may be required to login by providing a "USER ID" and a "PASSWORD" in input boxes 502 and 504, respectively.

After the login, the user may be presented with the second notification 506. The second notification 506 may comprise a first section 508 and a second section 510. The first section 508 may comprise a "USER ID" associated with the user, such as "USER_1". The second section 510 may comprise a "SCHEDULE" tab 510A, a "SEAT ASSIGNMENT" tab 510B, and a "ROUTE INFORMATION" tab 510C.

In an embodiment, the user may click on the "SCHEDULE" tab 510A to view a dispatch schedule 512 associated with the dispatch of the one or more vehicles. The "SCHEDULE" 512 may comprise information pertaining to the vehicle-id of each of the vehicles (depicted by a first column 512A) and the capacity of each of the vehicles (depicted by a second column 512B) that may be scheduled to dispatch from the source station (i.e., specified by the user in the corresponding travel request).

In an embodiment, the user may click on the seat assignment tab 510B to view a "SEAT ASSIGNMENT CHART" 514 associated with the user. The "SEAT ASSIGNMENT CHART" 514 may comprise the "USER ID" (depicted by a first column 514A) of the corresponding user, a "SEAT NUMBER" (depicted by a third column 514C) assigned to the user in a vehicle (depicted by second column 514B) among the vehicles scheduled to be dispatched.

In an embodiment, the user may click on the "ROUTE INFORMATION" tab 510C to view information 516 pertaining to the route associated with the travel request of the corresponding user. The information pertaining to the route 516 may comprise a geographical map 516A of the corresponding route and a trip time (depicted by a section 516B) associated with the route. For example, a user may raise a travel request to commute between a first station (e.g., "NODE_1") and a second station (e.g., "NODE_3"). Further, the user may be allotted a seat (e.g., "S-1") in a vehicle that may be scheduled to ply on a first route (e.g., "NODE_1->NODE_2->NODE_3->NODE_1") with the trip time of three hours. In this scenario, the route information (depicted by 516) may display a part of the geographical map 516A of the first route (i.e., NODE_1->NODE_2->NODE_3->NODE_1) and a part of the trip time (e.g., 2 hours and 15 minutes) (depicted by the section 516B) and/or a timestamp associated with the part of the trip based on the travel request of the user. Further, the route information 516 may present the user a status of a real time location (depicted by a pointer 516C) of the vehicle, after the vehicle has been dispatched, based on the real time location information received from the navigation device, installed in the vehicle, comprising GPS sensors.

A person having ordinary skill in the art will understand that the abovementioned GUI 500 is for illustrative purposes and should not be construed to limit the scope of the disclosure. In an embodiment, the "SEAT ASSIGNMENT" tab 5108 may not be available, when the seat allotment to the one or more users is not fixed.

Figure 6:
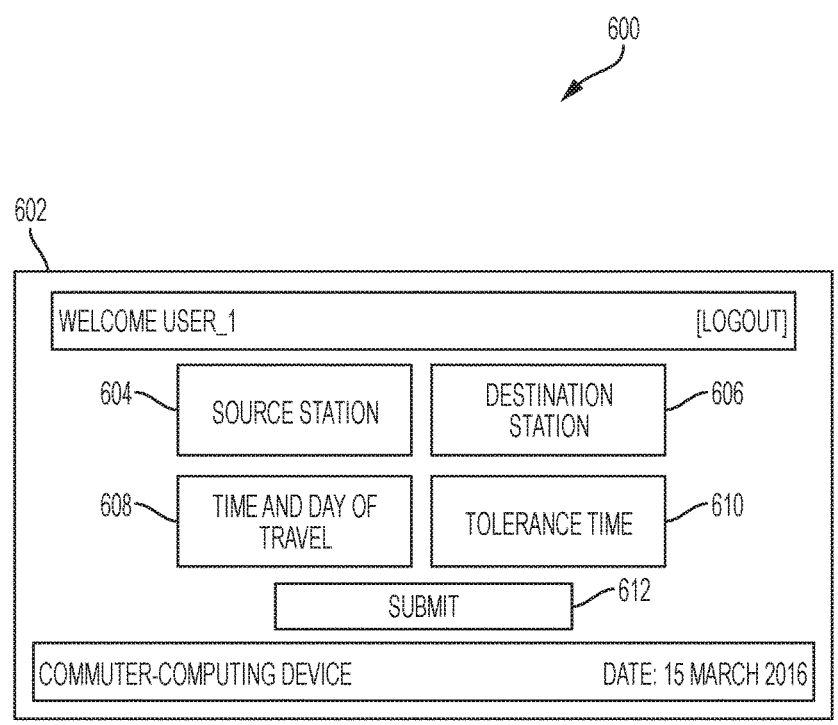
FIG. 6 is a block diagram that illustrates an exemplary Graphical User Interface (GUI) presented on an exemplary user-computing device for raising a travel request, in accordance with at least one embodiment.

FIG. 6 is a block diagram that illustrates an exemplary Graphical User-Interface (GUI) presented on an exemplary user-computing device for raising a travel request, in accordance with at least one embodiment. FIG. 6 is explained in conjunction with FIGS. 1-3.

The exemplary GUI, such as a GUI 600, may be displayed on a display screen of an exemplary commuter-computing device, such as the user-computing device 108, associated with each of the one or more users. A user from the one or more users may be required to log into a transportation platform by inputting his/her credentials, such as "USER ID" and "PASSWORD." In an embodiment, the transportation platform may be associated with the service provider of the one or more vehicles associated with a transportation agency. The processor 202 may present the GUI 600 on the user-computing device 108, when the user has logged in.

In an embodiment, the GUI 600 may comprise a travel request window 602. The travel request window 602 may comprise a "SOURCE STATION" tab 604 that may be clicked by the user to input the source station. Further, the user may click on another tab, such as a "DESTINATION STATION" tab 606, to input the destination station. Thereafter, the user may click on another tab, such as a "TIME AND DAY OF TRAVEL" tab 608, to input the time and the day of travel. Further, the user may click on another tab, such as a "TOLERANCE TIME" tab 610, to input the tolerance time associated with his/her travel request. Thereafter, the user may submit the travel request by clicking on a "SUBMIT" tab 612. After submitting the travel request, the user may receive the second notification indicative of the dispatch schedule of the dispatch of the vehicles.

The disclosed embodiments encompass numerous advantages. The disclosure provides a method and a system to generate a dispatch schedule for managing a dispatch of one or more vehicles along a route at one or more time instants. The disclosed methods and systems utilize a first demand for the one or more vehicles to generate a dispatch schedule for managing the dispatch of the vehicles at the one or more time instants, such that the first demand may be predicted based on historical demand. The dispatch schedule comprises a count of the vehicles from the one or more vehicles that are to be dispatched along the route at the one or more time instants. Further, the disclosed system and method dynamically update the generated dispatch schedule based on a current demand and a second demand, such that the second demand may be predicted based on the current demand. The updated dispatch schedule at a current time instant resolves a problem of unrealized demand associated with a temporally prior time instant. Further, the updated dispatch schedule may not alter the route of the one or more vehicles that are already dispatched. The disclosed method and the system dynamically update the dispatch schedule by optimizing one or more performance metrics specified by the service provider. The disclosed method and the system minimize resource misallocation by applying a feedback control over demand determination and prediction. The disclosed method and the system may be utilized by any transportation service provider, such as, but not limited to, a bus service provider, a train service provider, and a metro service provider to meet the public demand for the one or more vehicles.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for managing a dispatch of one or more vehicles on a route have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for managing a dispatch of vehicles based on generation of a dispatch schedule, the method comprising:
   generating, by one or more processors, a dispatch schedule for one or more vehicles at one or more time instants based on a first demand for the one or more vehicles at one or more stations in a route and a count of the one or more vehicles, wherein the dispatch schedule comprises at least a count of vehicles, from the one or more vehicles, to be dispatched from a first station of the one or more stations at the corresponding time instant;
   at a current time instant of the one or more time instants:
   predicting, by the one or more processors, a second demand for the one or more vehicles at each of the one or more stations, at the one or more time instants subsequent to the current time instant, based on a current demand received from one or more sensors at each of the one or more stations;
   updating, by the one or more processors, the dispatch schedule by varying the count of vehicles, from the one or more vehicles, to be dispatched from the first station based at least on the second demand and the count of the one or more vehicles; and
   transmitting, by one or more transceivers, a notification to a computing device installed in each of the one or more vehicles, wherein the notification comprises an updated dispatch schedule for the corresponding vehicle, wherein each of the one or more vehicle dispatches from the first station based on the updated dispatch schedule.

2. The method of claim 1, further comprising determining, by the one or more processors, a historical demand for the one or more vehicles, associated with a first count of one or more users, such that the first count of the one or more users commuted along the route at each of one or more other time instants, wherein the one or more other time instants are temporally prior to the one or more time instants.

3. The method of claim 2, wherein the first demand is associated with a second count of one or more users, wherein the second count of the one or more users is predicted to commute along the route based on the historical demand.

4. The method of claim 1, wherein the current demand at the current time instant is associated with a third count of one or more users, wherein the third count of the one or more users is scheduled to commute along the route at the current time instant.

5. The method of claim 4, wherein the second demand at time instants subsequent to the current time instant is associated with a fourth count of the one or more users, where in the fourth count of the one or more users is predicted to commute along the route at the corresponding time instant based on the current demand.

6. The method of claim 1, wherein the update of the dispatch schedule is further based on at least an unrealized demand or one or more performance metrics associated with a service provider of the one or more vehicles.

7. The method of claim 6, wherein a realized demand is associated with a set of first users from the one or more users, wherein the unrealized demand is associated with a set of second users from the one or more users such that a demand of the set of second users was unmet at a time instant prior to the current time instant.

8. The method of claim 6, wherein the one or more performance metrics comprise at least a demand served by the one or more vehicles, a count of vehicles dispatched from the one or more vehicles, a count of trips made by the one or more vehicles along the route or an average user waiting time.

9. The method of claim 8, wherein the demand served by the one or more vehicles is based on the count of vehicles dispatched and a capacity of each of the one or more vehicles dispatched.

10. A system for managing a dispatch of vehicles based on generation of a dispatch schedule, the system comprising:
   one or more processors configured to:
   generate a dispatch schedule for one or more vehicles at one or more time instants based on a first demand for the one or more vehicles at one or more stations in a route and a count of the one or more vehicles, wherein the dispatch schedule comprises at least a count of vehicles, from the one or more vehicles, to be dispatched from a first station of the one or more stations at the corresponding time instant;
   at a current time instant of the one or more time instants:
   predict a second demand for the one or more vehicles at each of the one or more stations, at the one or more time instants subsequent to the current time instant, based on a current demand received from one or more sensors at each of the one or more stations;

update the dispatch schedule by varying the count of vehicles, from the one or more vehicles, to be dispatched from the first station based at least on the second demand and the count of the one or more vehicles; and transmit a notification to a computing device installed in each of the one or more vehicles, wherein the notification comprises an updated dispatch schedule for the corresponding vehicle, wherein each of the one or more vehicle dispatches from the first station based on the updated dispatch schedule.

11. The system of claim 10, wherein the one or more processors are further configured to determine a historical demand, for the one or more vehicles, associated with a first count of one or more users, such that the first count of the one or more users commuted along the route at each of one or more other time instants, wherein the one or more other time instants are temporally prior to the one or more time instants.

12. The system of claim 11, wherein the first demand is associated with a second count of one or more users, wherein the second count of the one or more users is predicted to commute along the route based on the historical demand.

13. The system of claim 10, wherein the current demand at the current time instant is associated with a third count of one or more users, wherein the third count of the one or more users is scheduled to commute along the route at the current time instant.

14. The system of claim 13, wherein the second demand at time instants subsequent to the current time instant is associated with a fourth count of the one or more users, where in the fourth count of the one or more users is predicted to commute along the route at the corresponding time instant based on the current demand.

15. The system of claim 10, wherein the update of the dispatch schedule is further based on at least an unrealized demand or one or more performance metrics associated with a service provider of the one or more vehicles.

16. The system of claim 15, wherein the unrealized demand is associated with a set of second users, such that a demand of the set of second users, for the one or more vehicles, was unmet at a time instant prior to the current time instant.

17. The system of claim 15, wherein the one or more performance metrics comprise at least a demand served by the one or more vehicles, a count of vehicles dispatched from the one or more vehicles, a count of trips made by the one or more vehicles along the route or an average user waiting time.

18. The system of claim 17, wherein the demand served by the one or more vehicles is based on the count of vehicles dispatched and a capacity of each of the vehicles dispatched.

19. A computer program product for use with a computer, the computer program product comprising a non-transitory computer readable medium, wherein the non-transitory computer readable medium stores a computer program code for managing a dispatch of vehicles based on generation of a dispatch schedule, wherein the computer program code is executable by one or more processors to:

generate a dispatch schedule for one or more vehicles at one or more time instants based on a first demand for the one or more vehicles at one or more stations in a route and a count of the one or more vehicles, wherein the dispatch schedule comprises at least a count of vehicles, from the one or more vehicles, to be dispatched from a first station of the one or more stations at the corresponding time instant;

at a current time instant of the one or more time instants:

predict a second demand for the one or more vehicles at each of the one or more stations, at the one or more time instants subsequent to the current time instant, based on a current demand received from one or more sensors at each of the one or more stations;

update the dispatch schedule by varying the count of vehicles, from the one or more vehicles, to be dispatched from the first station based at least on the second demand and the count of the one or more vehicles; and transmit a notification to a computing device installed in each of the one or more vehicles, wherein the notification comprises an updated dispatch schedule for the corresponding vehicle, wherein each of the one or more vehicle dispatches from the first station based on the updated dispatch schedule.

\* \* \* \* \*